…

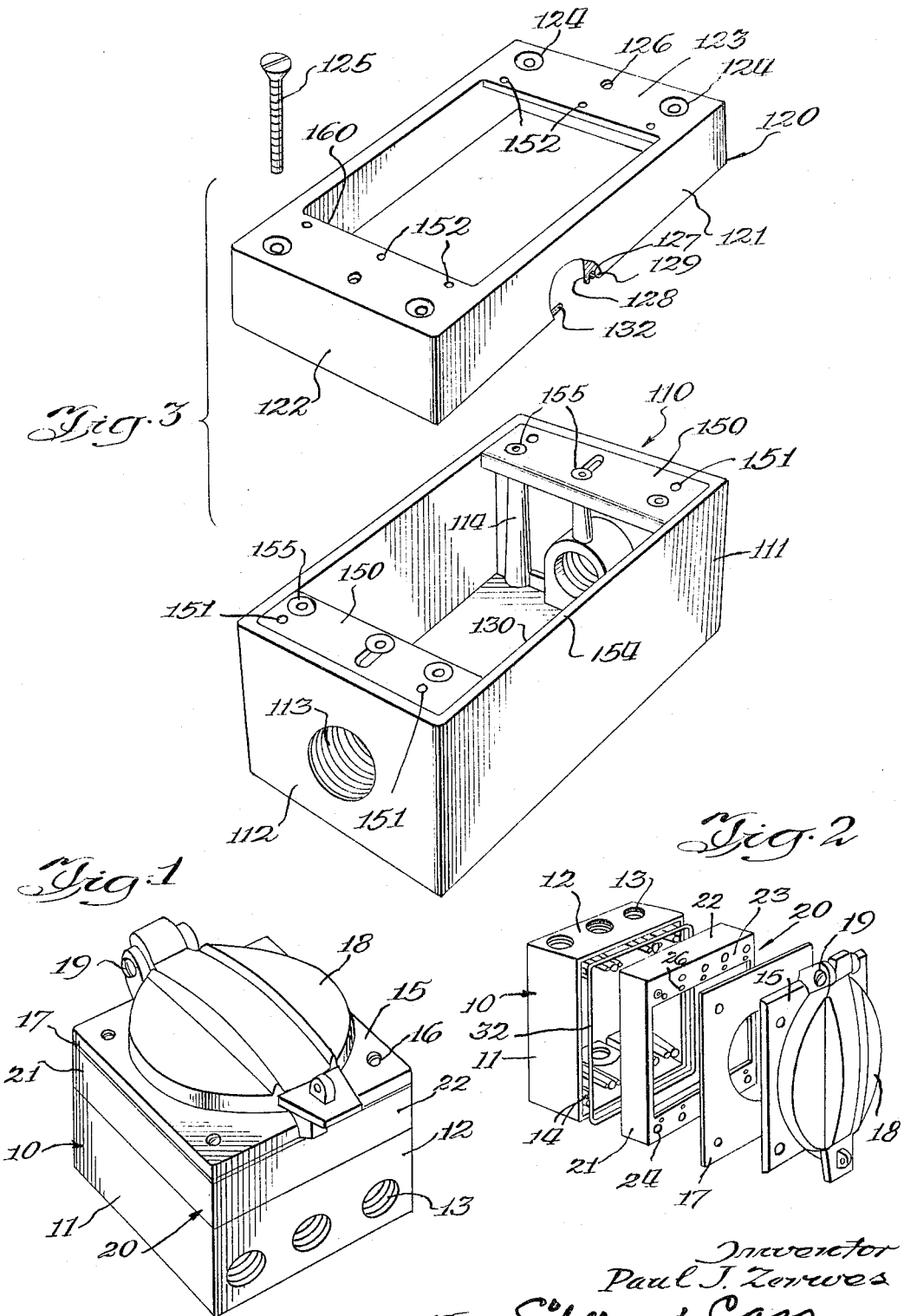

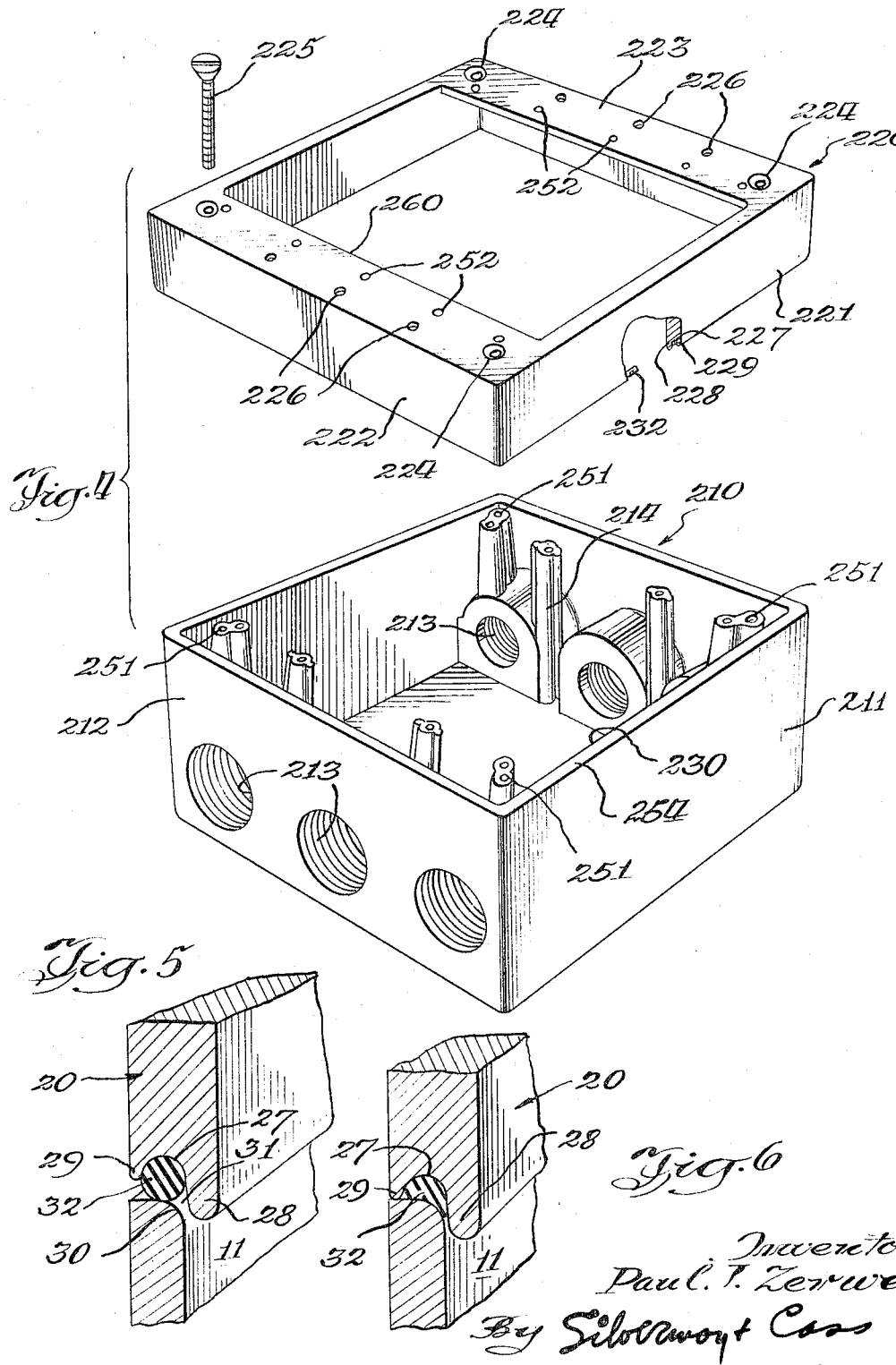

United States Patent Office 3,288,910
Patented Nov. 29, 1966

3,288,910
WEATHERPROOF EXTENSION FOR OUTLET BOX
Paul J. Zerwes, Chicago, Ill., assignor to Bell Electric Company, Chicago, Ill., a corporation of Illinois
Filed Jan. 21, 1964, Ser. No. 339,295
7 Claims. (Cl. 174—53)

This invention relates to new and useful improvements in electrical power outlet boxes of the type used in outdoor and wet environmental conditions and more particularly to a weatherproof seal for connecting an extension ring to such an outlet box.

Ordinary metal outlet boxes now in use are quite often of insufficient depth to accommodate larger switch mechanisms and related equipment. It has been proposed in the art to add an extension ring between the lower body portion of the box and its cover plate to, in effect, increase the volume of useable space within the box. By so doing larger equipment and higher amperage service can be employed with a greater wiring area. The use of such extension rings also permits such outlet boxes to be recessed in a wall for wiring convenience.

In utilizing such extension rings as just described, the maintenance of a completely weatherproof and sealed construction presents itself. Since such outlet boxes are used in trailer courts, shipping docks, farm yards, dairies, freight yards and other open and often unprotected locations, some means must be provided to completely seal the extension ring to the outlet box.

It is an object of the present invention to provide a weathertight seal for connection of an extension ring to an electrical power outlet box.

Another important object of the invention is to provide a weatherproof and dustproof connection between an extension ring and an outlet box, wherein the seal element is totally hidden and is not exposed to the atmosphere.

A still further object of the invention is to provide an extension for an outlet box which during installation is self-centering and seats quickly and easily without unnecessary manipulation to insure rapid installation.

Other objects of the invention are to provide a weatherproof and dustproof sealing means for outlet boxes and the like, bearing the above objects in mind, which is of simple construction, has a minimum number of parts, is relatively inexpensive to manufacture, can be installed in a minimum amount of time and is at all times efficient and safe in use.

For other objects and for a better understanding of the invention, reference may be had to the following detailed description taken in conjunction with the accompanying drawings in which:

FIG. 1 is a perspective view of an assembled electrical outlet box with an extension ring attached thereto constructed in accordance with the invention.

FIG. 2 is an exploded perspective view of the component parts of the structure shown in FIG. 1 with connecting screws omitted.

FIG. 3 is an exploded perspective view showing the manner of attachment of an extension ring to another type of outlet box with a portion of the extension ring being broken away to show the details of the seal means.

FIG. 4 is an exploded perspective view similar to that of FIG. 3 but showing the manner of attachment of an extension ring to a modified form of outlet box.

FIG. 5 is an enlarged sectional perspective view showing the details of the sealing means before final tightening of the extension ring against the outlet box body portion; and FIG. 6 is a view similar to that of FIG. 5 showing the sealing means after final tightening of the extension ring against the outlet box body portion.

Reference is now made more specifically to the drawings wherein like numerals designate similar parts throughout the several views.

In accordance with the present invention, there is formed a substantially rectangular electrical outlet box body portion 10 having a pair of spaced side walls 11 and opposing end walls 12, perpendicular to the side walls. The entire body portion 10 is preferably cast of aluminum, although any suitable material may well be used. One or more internally threaded openings 13 are provided in each end wall 12 for connection with various types of conduits. Preferably cast integrally with the outlet box body portion are a plurality of internally threaded screw pillars 14 to mount a cover plate and extension ring as later described.

In many installations a cover plate 15 is connected directly to the body portion of the outlet box by means of screws 16 with a flat sheet gasket 17 interposed therebetween. Depending upon the type of installation, the cover may be a plane cast aluminum plate or it may have one or more receptacle snap covers 18 hinged thereto as by means of a pin 19.

In order to increase the available space within the outlet box, an extension ring 20 is provided between the cover plate with its associated gasket 17 and the body portion 10. The extension ring is also preferably cast of aluminum or like material and has spaced side walls 21 and opposing end walls 22 perpendicular thereto. A pair of short flanges is provided at 23 extending from the end walls inwardly. At least four countersunk holes 24 are provided in flanges 23 for reception of flat head machine screws such as shown at 125 in FIG. 3 to engage in corresponding screw pillars 14 of the body portion 10, to tightly seat the extension ring thereof. Additional holes 26 are provided in flanges 23 for mounting of equipment within the box and for connection of the cover plate 15.

In order to insure a moistureproof and dustproof interconnection between the extension ring and the outlet box body portion, a novel sealing arrangement is employed, as shown in detail in FIGS. 5 and 6. The side walls 21 and the end walls 23 of extension ring 20 are each formed with a groove 27 on its bottom edge. This groove is defined by an inner lip 28 and an outer lip 29. It will be noted that the inner lip 28 is considerably longer than the outer lip. It should also be noted that all of the walls of the extension ring are somewhat greater in thickness than the walls of the body portion 10, so that when the two are brought together, the outer surface of the extension ring 20 will be substantially flush with the outer wall of the body portion, while the inner lip 28 will extend considerably downward inside the body portion inner wall. With reference again to FIGS. 5 and 6, it will be noted that the upper inside edges of the body portion end and side walls are rounded or otherwise bevelled as at 30 so that a generally triangular shaped area 31 is defined between this edge 30 and the inner surface of the long inner lip 28. A neoprene or other rubber material gasket 32, preferably in the familiar circular cross-section form of O-rings, is fitted in the groove 27 and when the extension ring is tightened against the body portion by taking up on the screws 125, the outer lip 29 will engage against the upper edge of the body portion walls before the inner lip 28 closes the space 31. The ring 32 is thereby prevented from extruding out between the engaging edges to the outside of the box, and instead extrudes down into the triangular space 31 providing a tight weatherproof seal. In such a sealing arrangement, no part of the seal 32 is open to the atmosphere and hence the ring is not likely to deteriorate. The extension ring seal is totally confined and the seal is nearly perfect.

It will be noted that when the extension ring 20 is fully seated upon the outlet box body portion 10, the groove 27, lips 28 and 29, and the rounded edge 30 of wall 11 cooperate to form a crescent-shaped space whose greatest transverse dimension is substantially less than the diameter of the thickness of the gasket 32. The gasket 32 will therefore be compressed and deformed as described into the space 31 to provide an effective seal.

The gasket 32 may be in the form of a complete ring fitted into the rectangular groove 27 of the extension ring 20 or it may be a length cut to size, with its free ends butted. In squeezing the extension down against the body 10, the abutted ends will press tightly and sealingly against one another to render the seal continuous about the periphery of the box.

FIGS. 3 and 4 illustrate respectively rectangular and square outlet boxes constructed in accordance with the invention. The box 110 has spaced side walls 111 and end walls 112. Threaded openings 113 in suitable internal reenforcing hubs enable the usual electrical conduit tubing to be connected to the box. Pillars 114 support a pair of bracket plates 150 which are suitably drilled and tapped at 151 to receive the fastening screws 125. These screws engage through suitable countersunk openings 124 in the flange 123 of the extension ring 120 and hold the ring against the lip 154 of the body 110. The inner edge of the lip 154 is bevelled at 130 like the edge 30 of the box 10. The extension ring 120 has side walls 121 and end walls 122 and its lower edge provided with the same grooved structure illustrated in FIGS. 5 and 6. There is an inner long lip 128, an outer short lip 129 and a groove 127 seating a resilient gasket or O-ring 132. Other threaded holes 152 in flange 123 align with threaded holes 155 in the bracket plates 150 to enable various apparatus such as switches, receptacles and the like to be secured to the ring 120 disposed the rectangular opening 160 of the ring. The threaded holes 152 are substitutes for holes 155.

The box 120 is of a construction similar to that of box 110 and the various parts are designated by the same reference characters as in FIG. 4 except for the prefix "2" instead of "1."

In FIGS. 3 and 4 there is no illustration of a cover plate or plane gasket such as 15 and 17 respectively of FIG. 2. Furthermore the apparatus such as 18 which is to be mounted on the outlet boxes is not illustrated. It is understood that there will be some equipment associated with the outlet box, usually with a cover plate, but the invention is concerned only with the extension ring and the means for sealing same to the box body, including so much of the body to enable cooperative coupling of the ring therewith. The electrical apparatus which will be associated with the boxes comprise switches, receptacles, lights, etc. and for purposes of indicating such, the claims will refer to "electrical apparatus" in the environment of the invention, but not by way of limitation.

While I have shown and described a preferred embodiment of the invention, it is to be understood that the drawings and detailed disclosure are to be construed in an illustrative rather than a limiting sense since various modifications and substitutions of equivalents may be made by those skilled in the art within the spirit and scope of the invention as defined in the appended claims.

I claim:

1. In an electrical outlet box including a box-like open top body having walls defining same and provided with means for securing electrical apparatus therein; the improvement which comprises a weather-proof extension ring mounted on said body, said ring being provided with means for securing said electrical apparatus thereto instead of to said body, a groove formed in the peripheral facing edge of said extension ring facing said body wall ends, resilient gasket means fitted within said groove and protruding therefrom and adapted to be engaged against the said wall ends and, a depending lip on said peripheral edge forming the inner side of said groove means for securing said ring to said body with the lip overlying the inner edge of the end walls and with said gasket means between the ring and wall ends in a sealed connection compressing said gasket means therebetween and extruding same laterally of said wall ends into engagement with the depending lip.

2. A structure as claimed in claim 1 in which the peripheral edge of said ring is of a thickness greater than that of said wall ends with overhang on the interior of said body and in which the lip depends from the overhang, said lateral extrusion being directed inwardly between the walls and said lip.

3. A structure as claimed in claim 1 in which the wall ends have their inner corner edges bevelled and in which the peripheral facing edge of the ring is thicker than said wall ends, said depending lip being adapted to move into engagement with the interior of said walls, while the outer corner edge of said ring moves into contact with the facing wall ends at their outer corner edges, thereby defining a crescent-shaped cross sectional space within which said gasket means is adapted to be compressed.

4. A structure as claimed in claim 3 in which said gasket means is of circular cross section greater in diameter than the transverse dimension of said crescent-shaped cross section when the ring is fully engaged against said body.

5. In an electrical outlet box including a lower body portion, said body portion having spaced vertical end and side walls; the improvement comprising an extension ring adapted to be mounted on said body portion and have electrical apparatus secured thereto instead of to said body portion, said ring having spaced end and side walls, the walls of said ring being thicker than the walls of said body portion and adapted to fit flush therewith along the outer surface of said body portion, a groove formed in the peripheral bottom face of said extension ring, said groove being defined by a short outer lip and a long inner lip, said inner lip being adapted to overlie a section of the inner faces of said body portion walls when the ring is secured to said body portion, the inner edge of the top peripheral face of said body portion being curved, resilient gasket means fitted within said groove and adapted to be seated against the top peripheral face of said body portion, and means to secure said extension ring tightly to said body portion, whereby said gasket is compressed and extruded into a generally triangular cross-sectional space between the long inner lip and the curved inner edge of the top peripheral face of said body portion.

6. An extension ring as set forth in claim 5, wherein said resilient gasket means is circular in cross-section.

7. An extension ring as set forth in claim 5 in which said ring is provided with means for securing electrical apparatus thereto.

References Cited by the Examiner

UNITED STATES PATENTS

| | | |
|---|---|---|
| 537,182 | 4/1895 | Brown. |
| 759,081 | 5/1904 | Delehanty _____ 220—46 |
| 830,182 | 9/1906 | Skov _____ 220—46 |
| 2,378,861 | 6/1945 | Peevey. |
| 2,421,805 | 6/1947 | Peck _____ 220—46 |
| 2,475,836 | 7/1949 | Henricksen et al. _____ 220—46 |
| 3,137,763 | 6/1964 | Jones _____ 174—48 X |

FOREIGN PATENTS

| | | |
|---|---|---|
| 885,363 | 12/1961 | Great Britain. |
| 40,934 | 6/1937 | Netherlands. |

THERON E. CONDON, *Primary Examiner.*

JAMES R. GARRETT, *Examiner.*

UNITED STATES PATENT OFFICE
CERTIFICATE OF CORRECTION

Patent No. 3,288,910                      November 29, 1966

Paul J. Zerwes

It is hereby certified that error appears in the above numbered patent requiring correction and that the said Letters Patent should read as corrected below.

Column 2, line 34, for "thereof" read -- thereon --; column 3, line 36, after "disposed" insert -- in --; line 39, for "120" read -- 210 --; column 4, line 1, strike out "and"; line 2, after "groove" insert -- and --.

Signed and sealed this 19th day of September 1967.

(SEAL)
Attest:

ERNEST W. SWIDER
Attesting Officer

EDWARD J. BRENNER
Commissioner of Patents